United States Patent
Farha et al.

(10) Patent No.: US 6,752,919 B2
(45) Date of Patent: Jun. 22, 2004

(54) PROMOTED ABSORBENTS FOR THE REMOVAL OF CONTAMINANTS

(75) Inventors: Floyd E. Farha, Oklahoma City, OK (US); Eugene C. Fendley, II, Norman, OK (US)

(73) Assignee: Chemical Products Industries, Inc., Norman, OK (US)

( * ) Notice: Subject to any disclaimer, the term of this patent is extended or adjusted under 35 U.S.C. 154(b) by 0 days.

(21) Appl. No.: 10/210,745

(22) Filed: Jul. 31, 2002

(65) Prior Publication Data

US 2004/0023018 A1 Feb. 5, 2004

(51) Int. Cl.$^7$ ............................. C10G 29/04; C07C 7/12
(52) U.S. Cl. ................... 208/251 R; 208/253; 585/820; 585/823
(58) Field of Search ............................. 208/251 R, 253; 585/820, 823

(56) References Cited

U.S. PATENT DOCUMENTS

| | | |
|---|---|---|
| 4,348,301 A | 9/1982 | Crompton et al. |
| 5,008,036 A | 4/1991 | Crompton et al. |
| 5,213,785 A | 5/1993 | Fentress et al. |

*Primary Examiner*—Walter D. Griffin
*Assistant Examiner*—Tam M. Nguyen
(74) *Attorney, Agent, or Firm*—Locke Liddell & Sapp LLP; William D. Jackson

(57) ABSTRACT

A process for the removal of trace metals from a hydrocarbon stream includes contacting the hydrocarbon stream with an absorbent material comprising antimony pentoxide supported on an absorbent substrate. The hydrocarbon product is then withdrawn from the absorbent material to provide a purified product in which 99.5 wt. % of the trace metal has been removed. Preparation of the antimony pentoxide-promoted absorbent entails treating a particulate porous substrate with an aqueous solution of antimony pentoxide. The absorbent substrate has an average particle size within the range of 1–5 mm and an average pore volume within the range of 0.7–0.85 cubic centimeters per gram. At least 80% of the surface area of the support is contained within the internal pore volume of the absorbent. The absorbent support is contacted with the antimony pentoxide solution. Once the solution has been applied to the support, the mixture is agitated to ensure even distribution of the antimony pentoxide in the internal pore volume of the support. The antimony pentoxide support is then dried at an elevated temperature.

7 Claims, 2 Drawing Sheets

PROMOTED ABSORBENTS FOR THE REMOVAL OF CONTAMINANTS

FIELD OF THE INVENTION

This invention relates to promoted absorbents and their preparation and more particularly to antimony pentoxide-promoted porous absorbents and their preparation and use in the removal of metal contaminates from hydrocarbon products.

BACKGROUND OF THE INVENTION

The presence of even trace amounts of metals such as copper and iron in hydrocarbon products can be highly deleterious. An example is found in metal contaminated middle distillate fractions, such as fuel oils involving kerosene, jet fuel, and diesel fuel. Contaminates, such as small amounts of copper and iron, can be present in such hydrocarbon fractions from a number of sources. For example, in the purification of hydrocarbon fractions designated for use as a jet fuel or as a diesel fuel, copper and/or iron-based catalysts can be used to remove offensive thiohydrocarbons, such as mercaptans, to produce a product stream of a "sweetened" hydrocarbon fuel. Subsequent to the sweetening process, the product stream can be subjected to an absorption procedure to remove trace amounts of copper and iron from the hydrocarbon fuel. A suitable absorption process can involve passing the sweetened product streams through a bed of an absorbent which absorbs the contaminated copper or other metal from the stream. An aluminum silicate absorbent, such as attapulgite, bentonite, kaolinite, halloysite, or the like, may be used. In addition to an aluminum silicate clay absorbent, large pore aluminosilicate zeolites, such as zeolite Y, may also be used to absorb trace metals from the stream.

SUMMARY OF THE INVENTION

In accordance with the present invention, there is provided a process for the preparation of a promoted absorbent effective for the removal of metal contaminants from hydrocarbon products. In carrying out the invention, there is provided a porous absorbent substrate in which the predominant surface area is contained within the internal pore volume of the substrate material. The absorbent substrate is contacted with a solution of an absorption-promoting agent to provide a mixture of the absorbent substrate with the solution of promoting agent to at least partially fill the internal pore volume of the substrate with the solution of promoting agent. The mixture of the particulate substrate and the promoting agent solution is agitated for a time sufficient to effect distribution of the promoting agent within the internal pore volume of the absorbent support material. Thereafter, the support substrate is contacted with a solution of the promoting agent in an amount, when added to the solution of promoting agent previously applied, to provide an amount of the promoting agent solution which is at least equal to the pore volume of the porous absorbent substrate. This mixture is agitated for time sufficient to effect distribution of the promoting agent within the internal pore volume of the support material, and the absorbent substrate material is then dried at a temperature sufficient to dehydrate the substrate material with the promoting agent in place. The promoting agent is an oxide of a metal of Group 15 (new notation) of the Periodic Table, which metal comprises antimony or the Group 15 metals adjacent to antimony, specifically arsenic or bismuth. Preferably, the Group 15 metal is antimony.

In a preferred embodiment of the invention, there is provided a process for the preparation of an antimony pentoxide-promoted absorbent. In carrying out the invention, a particulate porous absorbent substrate is treated with an aqueous solution of antimony pentoxide, typically having an antimony pentoxide concentration of about 10 wt. % or more. The porous absorbent substrate has an average particle size within the range of 1–5 mm and an average pore volume within the range of 0.7–0.85 and preferably within the range of 0.75–0.8 cubic centimeters/gram. At least 80% of the surface area of the support is contained within the internal pore volume of the absorbent. The absorbent support is contacted with the antimony pentoxide solution, or sol, in an amount equal to or in excess of the pore volume of the porous absorbent support. The treating solution can be applied to the porous absorbent support in a single treatment, but preferably the treating solution is applied in at least two stages. Whenever multiple application stages are employed, after the initial stage, the mixture of the particulate absorbent and the antimony pentoxide solution is agitated in order to effect a distribution of the antimony concentration within the pore volume of the support. Thereafter, the absorbent material can be contacted in one or two additional stages with the antimony pentoxide solution in a total amount, including the initial step, equal to or in excess to the pore volume of the porous absorbent support material. The absorbent material is then dried at an elevated temperature sufficient to dehydrate the support.

In a further aspect to the present invention, there is provided a process for the removal of a trace metal, such as copper or iron, from a hydrocarbon product contaminated by the trace metal. In carrying out this aspect of the invention, the hydrocarbon product is contacted with an absorbent material comprising antimony pentoxide supported on an absorbent substrate. The hydrocarbon product is then withdrawn from the absorbent material to provide a purified hydrocarbon product in which at least 99.5 wt. % of the trace metal in the feedstock is removed providing a final product having a trace metal content of no more than 0.5 wt. % of the trace metal content of the feed product. In a preferred embodiment of the invention, the trace metal comprises copper such as may be present due to a sweetening process carried out over a copper catalyst. Preferably the substrate material is a fired attapulgite clay with a water content of about 5.0 wt. % or less.

The purified product preferably exhibits a copper content of about 0.03 ppm or less, as indicated by experimental work described below. The copper content of the purified product may be reduced to a value down to about 0.01 ppm, and it is preferred in carrying out the invention to provide a copper content within the range of about 0.01–0.03 ppm over a prolonged portion of use of the promoted absorbent.

DETAILED DESCRIPTION OF THE INVENTION

Figure 1:
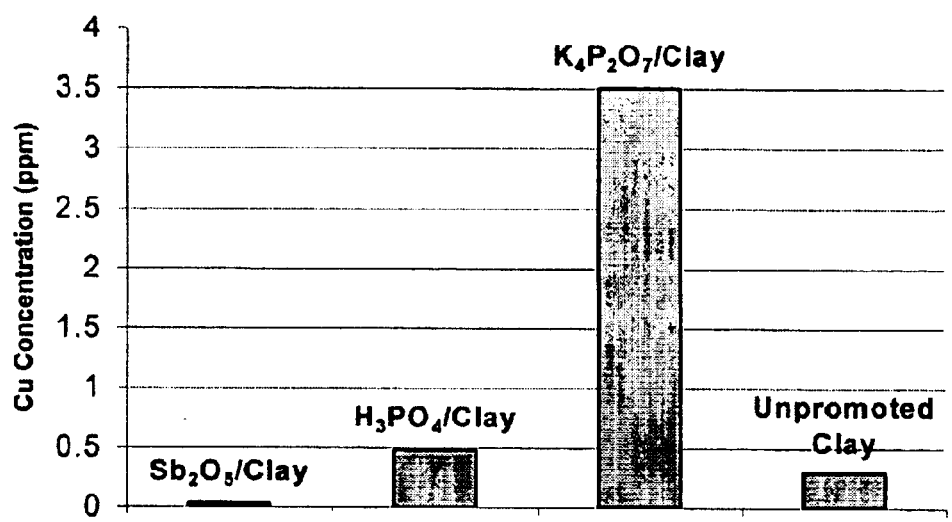
FIG. 1 is a bar graph illustrating copper concentrations resulting from batch treatments of kerosene employing unpromoted clay and clay promoted with $Sb_2O_5$, $H_3PO_4$, and $K_4P_2O_7$.

The present invention involves the promoted absorbants, particularly antimony pentoxide-promoted absorbants, and their preparation and use in removing trace materials, such as copper, from middle distillate fractions. Typically hydrocarbon fractions will contain trace amounts of metal, such as copper and iron, due to the use of a metal catalyst in a sweetening process applied to remove organic compounds, such as mercaptans. The distillate fractions may be characterized as having initial and final boiling points within the range of about 150–400° C. The invention is particularly applicable to the removal of copper from jet fuel having a boiling point range of about 180–300° C. and from diesel fuel having a boiling point range of about 230–400° C.

The antimony pentoxide-promoted absorbant materials may take the form of any suitable absorbant, typically a clay material as described below, of suitable particle size and pore size within an internal pore volume forming at least 80% of the surface area of the support material. The absorbants are treated with a colloidal dispersion of antimony pentoxide by an incipient wetness impregnation technique to provide for a relatively even distribution of antimony pentoxide within the internal pore volume of the absorbant. A preferred absorbant is fired attapulgite clay, as described in greater detail below. However, other suitable absorbants that can be used in carrying out the invention include montmorillonite clays, such as bentonite, kaolin clay, such as kaolinite, halloysite, diatomaceous earths, and other naturally occurring or synthetic clay materials. Other absorbants useful in carrying out the invention include organoclays in the form of polyorganosilicate graft copolymers in which a monomer, such as styrene, or polymer, such as polystyrene, is bonded to a polysilica containing vinyl radicals.

As noted previously, a preferred absorbent involves attapulgite clay, and the invention will be described with respect to attapulgite clay, which has been dried to a water content of 5 wt. % or less.

Antimony pentoxide is only sparingly soluble in water and the solution or sol employed in carrying out the present invention is actually a colloidal dispersion of antimony pentoxide. Antimony pentoxide may be prepared by any suitable procedure which typically will involve the reaction of an antimony component, such as elemental antimony metal or antimony trioxide, with hydrogen peroxide to produce colloidal antimony pentoxide as disclosed in U.S. Pat. No. 4,348,301 to Crompton et al, U.S. Pat. No. 5,008,036 to Crompton et al, and U.S. Pat. No. 5,213,785 to Fentress et al. Typically, antimony trioxide is slurried in water in the presence of a stabilizer and contacted with an aqueous solution of hydrogen peroxide under controlled temperature conditions to arrive at a relatively concentrated sol of antimony pentoxide. The conversion of the antimony trioxide to antimony pentoxide may be carried out in either batch-type or continuous operations. For a further disclosure of the suitable techniques for formation of colloidal dispersions of antimony pentoxide, reference is made to the aforementioned U.S. Pat. Nos. 4,348,301, 5,008,036, and 5,213,785, the entire disclosures of which are incorporated herein by reference.

In experimental work respecting the present invention, an incipient wetness technique was employed to promote an attapulgite clay-based absorbent with antimony pentoxide and potassium pyrophosphate. Preparation of the promoted absorbents involved using the incipient wetness impregnation (IWI) technique to deposit the promoters onto a granular clay support provided by fired attapulgite clay having a residual water of hydration of about 2 wt. %. Prior to the wetting step, the granular clay support was sifted with a No. 30 W. S. Tyler sieve to remove fine clay particles. The resulting clay support had an average particle size of between 1 mm and 5 mm. The antimony pentoxide ($Sb_2O_5$) promoted clay was prepared by impregnation with an aqueous $Sb_2O_5$ sol.

The $Sb_2O_5$ sol was prepared in a similar fashion to the methods disclosed in the aforementioned patents to Fentress et al and Compton et al by the reaction of 103 grams antimony trioxide ($Sb_2O_3$) powder wetted with 3 wt. % ethylene glycol, with 72 grams of 35% hydrogen peroxide ($H_2O_2$) (equivalent to about 2.2 moles of $H_2O_2$/mole of $Sb_2O_3$). Prior to the addition of the $H_2O_2$, an aqueous stabilizer solution was added to the aqueous $Sb_2O_3$ slurry (103 grams $Sb_2O_3$ powder, 87 grams $H_2O$). The stabilizer solution consisted of 27.2 grams of 75% phosphoric acid ($H_3PO_4$) and 89.9 grams of triethanolamine (TEA). After the stabilizer solution was added to the $Sb_2O_3$ slurry, a thermometer was placed into the slurry and the beaker was placed on a stir plate. The 35% $H_2O_2$ solution was added slowly to the $Sb_2O_3$ slurry so as to maintain the reaction temperature below 180° F. Once the reaction was complete, the white slurry turned to a clear solution containing 29 wt. % $Sb_2O_5$.

Prior to impregnation of the $Sb_2O_5$ onto the clay granules, the $Sb_2O_5$ sol was diluted in order to provide a volume sufficient to achieve the wetness point of the support with $Sb_2O_5$ loading within the range of about 10–15 wt. %. By starting with approximately 200 grams of dried and sifted clay granules (wetness point of clay support=0.78 $cm^3$ liquid/gram of clay), it was necessary to use about 156 $cm^3$ of $Sb_2O_5$ sol to completely saturate the pore volume of the support. By adding 80 $cm^3$ of pure $H_2O$ to 75 $cm^3$ of 29% $Sb_2O_5$ solution, sufficient liquid having an $Sb_2O_5$ concentration of about 14.0 wt. % was provided to fill the pores of the support. The wetting step involved depositing the liquid solution onto the clay support in three steps with extensive mixing between liquid treatment steps to insure even distribution of $Sb_2O_5$. Once the impregnation was complete, the promoted clay was dried in a convection oven at 350° F. for about 2 hours.

The preparation of $H_3PO_4$ promoted clay involved wetting approximately 300 grams of dried and sifted attapulgite clay with an aqueous solution of phosphoric acid ($H_3PO_4$). A commercially available 75% $H_3PO_4$ solution was diluted to 20% $H_3PO_4$ to provide sufficient liquid volume to reach the wetness point of the clay. 234 $cm^3$ of 20% aqueous $H_3PO_4$ was added in three steps with extensive mixing in between. After wetting, the sample was dried at 350° F. for about 2 hours.

The $K_4P_2O_7$ promoted clay was prepared using the IWI technique as described previously for the $Sb_2O_5$ and $H_3PO_4$ promoted samples. To achieve 10 wt. % $K_4P_2O_7$ loading on the clay, 32.7 grams of $K_4P_2O_7$ were dissolved in 255 $cm^3$ $H_2O$ to provide sufficient liquid volume to wet 327 grams of the dried and sifted clay granules. After dissolving the $K_4P_2O_7$ into the $H_2O$, the solution was added to the clay support in three steps with mixing in between each step. Once mixing was complete, the sample was dried in the oven at about 350° F. for around 2 hours.

Batch analysis experiments were carried out involving placing equal volumes of absorbent (promoted and unpromoted clay) and kerosene into a volumetric flask and sealing with a stopper. Once sealed, the flask was placed into a heated water bath and the contents heated from room temperature to the temperature of the bath. Batch experiments were performed on $Sb_2O_5$ promoted clay, $H_3PO_4$ promoted clay, $K_4P_2O_7$ promoted clay, and unpromoted clay. In each of the experiments, approximately 90 $cm^3$ of kerosene, containing about 25 ppm (by weight) of copper was placed into a 250-mL volumetric flask with approximately 90 cm$^3$ of absorbent. Once the flask was sealed, it was placed into a water bath at 100° F. Periodically (about every 5 minutes), the contents in the flask were swirled to allow for intimate contact between the kerosene and the absorbent. After 30 minutes, the flask was removed from the water bath and the kerosene was separated from the absorbent via gravity filtration. After filtration, the sample was retained for residual copper analysis. An induced coupled plasma (ICP) technique was used to analyze the samples for residual copper.

Flow experiments were conducted in 2 quartz tube reactors (½ inch O.D.) connected in series. The kerosene was transported from a 1-Liter flask to the reactors via a variable flow mini-pump. Heat was supplied to the reactors via heating tape, which was connected to a solid-state power controller with adjustable output. The temperature was monitored via two digital thermometers equipped with thermocouples, which was placed directly between the heating tape and outside of the quartz tube reactors. The temperature was maintained at approximately 150° F. for all of the flow experiments. Each reactor was able to hold approximately 20–25 cm$^3$ of absorbent giving a total absorbent volume of around 50 cm$^3$. The kerosene flow to the reactors was adjusted to yield a liquid hourly space velocity (LHSV) ranging from 1.5–2.0 hr$^{-1}$. The samples obtained from the product stream were collected approximately every 2–3 hours and were subsequently subjected to residual copper analysis.

The results of the batch experiments are shown in FIG. 1 in which the bar graphs indicate the comparison between the different absorbents on the removal of copper from the kerosene. As shown in FIG. 1, the Sb$_2$O$_5$ promoted clay was more efficient in the removal of copper from kerosene than either unpromoted clay, H$_3$PO$_4$ promoted clay, or K$_4$P$_2$O$_7$ promoted clay.

As noted previously, the initial copper concentration of the untreated kerosene was 25 ppm (wt. %). After treating the kerosene with Sb$_2$O$_5$ promoted clay, the copper concentration was reduced to 0.03 ppm, corresponding to a removal of 99.9% of the copper from the sample. As indicated by the data in FIG. 1, the Sb$_2$O$_5$ promoted absorbent is much more efficient in the removal of copper from kerosene than either of the other promoted absorbents or the unpromoted clay which removed 98.8 wt. % of the copper from the kerosene.

Figure 2:
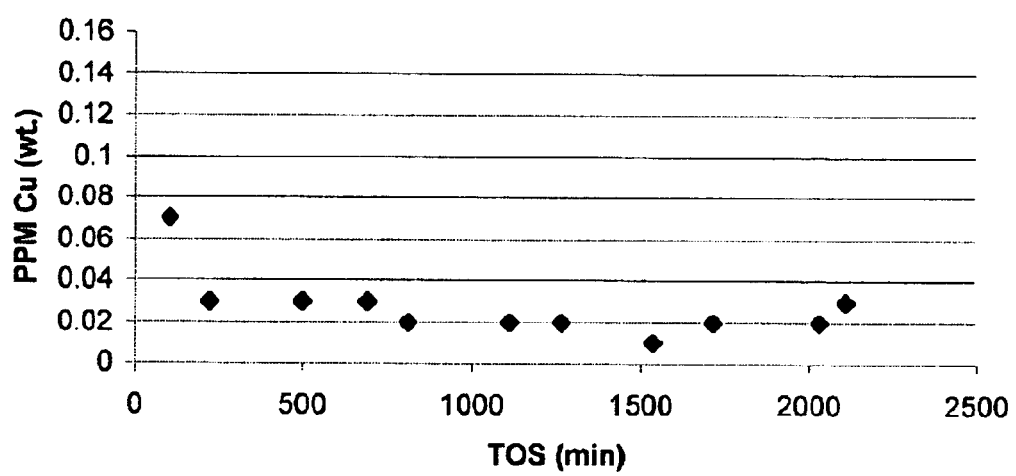
FIG. 2 is a graph illustrating the copper concentration plotted on the ordinate versus the time on stream plotted on the abscissa for a hydrocarbon stream passed over an antimony pentoxide-promoted absorbent.

The flow experiments were carried out with the unpromoted clay and Sb$_2$O$_5$ promoted clay absorbents following the protocols described previously. The Sb$_2$O$_5$ promoted absorbent was exposed to kerosene containing 24.9-ppm copper for about 35 hours and exhibited efficient copper removal for the entire run. The results are shown in FIG. 2 of copper concentration in weight parts per million plotted on the ordinate versus time on stream (TOS) in minutes on the abscissa. With the exception of the first sample, every treated kerosene sample analyzed for no more than 0.03-ppm copper. This corresponded to removal of 99.9% of the initial copper present in the kerosene. The average LHSV for the experimental work with the Sb$_2$O$_5$ promoted clay was 1.96 hr$^{-1}$, equivalent to processing approximately 3400 cm$^3$ of kerosene over 49 cm$^3$ of absorbent.

Figure 3:
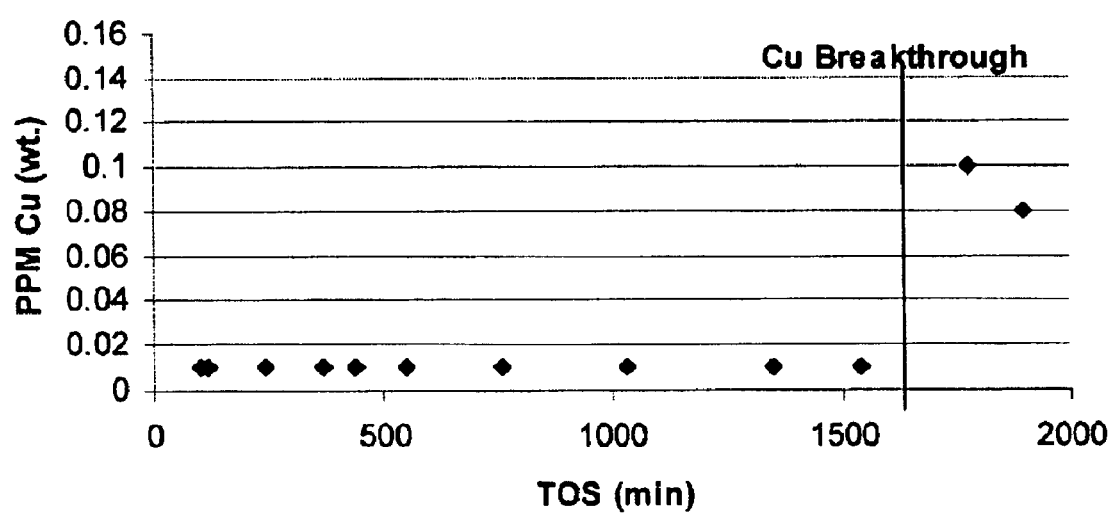
FIG. 3 is a graph of copper concentration plotted on the ordinate versus time on stream plotted on the abscissa for a hydrocarbon treated with an unpromoted absorbent.

The same flow experiment was carried out on the unpromoted clay. The results are shown in FIG. 3 where the copper concentration (ppm) is plotted on the ordinate versus time on stream (TOS) in minutes on the abscissa. As shown in FIG. 3, the unpromoted clay did an acceptable job in removing the copper in the kerosene for an initial period of time. However, after approximately 29.6 hours, a substantial increase in the copper concentration of the treated kerosene was observed.

The average LHSV for the experiment performed on the unpromoted absorbent was 1.67 hr$^{-1}$. Under this flow condition, the copper "breakthrough" occurred when approximately 2500 cm$^3$ of kerosene had been processed over the absorbent. This is significant because when compared to the Sb$_2$O$_5$ promoted absorbent, after processing approximately 3400 cm$^3$ of kerosene at a higher LHSV (1.97 hr$^{-1}$), no copper "breakthrough" was observed.

By analysis of the foregoing experimental work, it is evident that the Sb$_2$O$_5$ promoted absorbent is more efficient in the removal of trace metals, such as copper, from liquid hydrocarbon fuels, than unpromoted clay, H$_3$PO$_4$ promoted clay, and K$_4$P$_2$O$_7$ promoted clay. The Sb$_2$O$_5$ promoted absorbent is highly effective for trace metals removal in liquid hydrocarbon streams.

While a preferred application of the present invention is in the preparation of antimony pentoxide promoted absorbents, the incipient wetness technique described herein can also be used to establish promoted absorbents based upon arsenic and bismuth. Thus, the incipient wetting technique can be employed to distribute a compound such as bismuth pentoxide or arsenic pentoxide within the internal pore volume of a porous absorbent substrate.

Having described specific embodiments of the present invention, it will be understood that modifications thereof may be suggested to those skilled in the art, and it is intended to cover all such modifications as fall within the scope of the appended claims.

What is claimed:

1. A process for removal of copper from a copper-contaminated hydrocarbon product comprising,
    (a) contacting said contaminated hydrocarbon product with an absorbent material comprising antimony pentoxide supported on a porous absorbent substrate; and
    (b) withdrawing said hydrocarbon product from said absorbent substrate to provide a purified hydrocarbon product in which at least 99.5 wt. % of the copper content of the feed product has been removed.

2. The process of claim 1 wherein said substrate material is an absorbent clay.

3. The process of claim 2 wherein said absorbent clay is attapulgite clay.

4. The process of claim 3 wherein said attapulgite clay has been dried to provide a water content of said clay within the range of 1–5 wt. %.

5. The process of claim 1 wherein said antimony pentoxide is supported predominantly within the internal pore volume of said porous absorbent substrate.

6. The process of claim 5 wherein at least 80% of the surface area of said absorbent substrate is contained within the internal pore volume of said absorbent substrate.

7. The process of claim 6 wherein said purified hydrocarbon product has a copper content of no more than 0.03 ppm.

* * * * *